US008409870B2

(12) United States Patent
Van Wuijckhuijse et al.

(10) Patent No.: US 8,409,870 B2
(45) Date of Patent: Apr. 2, 2013

(54) MATRIX FOR REAL-TIME AEROSOL MASS SPECTROMETRY OF ATMOSPHERIC AEROSOLS AND REAL-TIME AEROSOL MALDI MS METHOD

(75) Inventors: Arjan Laurens Van Wuijckhuijse, Hendrik-Ido-Ambacht (NL); Charles Eliza Kientz, Delft (NL); Carla Elisabeth Anna Maria Degenhardt-Langelaan, Delft (NL); Johannes Cornelis Maria Marijnissen, Breda (NL); Willemina Anna Van Den Brink-Kleefsman, Kootwijkerbroek (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 155 days.

(21) Appl. No.: 12/742,093

(22) PCT Filed: Nov. 13, 2008

(86) PCT No.: PCT/NL2008/050721
§ 371 (c)(1), (2), (4) Date: Jul. 14, 2010

(87) PCT Pub. No.: WO2009/064180
PCT Pub. Date: May 22, 2009

(65) Prior Publication Data
US 2012/0018628 A1 Jan. 26, 2012

(30) Foreign Application Priority Data
Nov. 13, 2007 (EP) .................................... 07120550

(51) Int. Cl.
*G01N 24/00* (2006.01)

(52) U.S. Cl. ........... 436/173; 436/86; 250/282; 250/283

(58) Field of Classification Search ........................ None
See application file for complete search history.

(56) References Cited

U.S. PATENT DOCUMENTS

2005/0035285 A1 2/2005 Tan et al.
2005/0158863 A1 7/2005 Stahl et al.
2006/0261267 A1 11/2006 Sze et al.

FOREIGN PATENT DOCUMENTS

WO WO-02/052246 7/2002

OTHER PUBLICATIONS

Van Baar et al. "Detection of Biological Aerosols by MALDI On-Line Aerosol TOF MS", Proc. 2001 ECBC Scientific Conference on Chemical and Biological Defense Research, 2001.* Extended European Search Report for EP Application No. 07120550.4, mailed on Jan. 17, 2008, 9 pages.

Gentric et al., "Hydrogen bonding abilities and self-association of some potentially bifunctional catalysts. Part 2. Mercaptoazole derivatives" J. Chem. Soc., Perkin Trans 2 (1977) 8:1015-1019.

Search and Examination Report for Singapore Patent Application No. 201003315-7, dated Jun. 10, 2011, 17 pages.

Domin et al., Rapid Commun. Mass Spectrom. (1999) 13(4):222-226.

He et al., J. Am. Soc. Mass Spectrom. (1997) 8(2):140-147.

International Search Report for PCT/NL2008/050721, mailed on Jan. 28, 2009, 4 pages.

Raju et al., Rapid Commun. Mass Spectrom. (2001) 15(19):1879-1884.

Russell et al., J. Mass Spectrom. (1996) 31(3):295-302.

Ryan, Analyst (1950) 75(895):557-561.

Xu et al., J. Am. Soc. Mass Spectrom. (1997) 8(2):116-124.

Van Wuijckhuijse, "Aerosol Time-of-Flight Mass Spectrometry: An approach to detect, select and identify Bioaerosols," PhD Thesis (2003).

* cited by examiner

Static MALDI vs. Real-Time MALDI

*Primary Examiner* — Yelena G Gakh
(74) *Attorney, Agent, or Firm* — Morrison & Foerster LLP

(57) ABSTRACT

The invention is directed to a matrix material for MALDI mass spectrometry, to a matrix composition for MALDI mass spectrometry, in particular for aerosol MALDI mass spectrometry, to a MALDI mass spectrometry method, in particular an aerosol MALDI mass spectrometry method, to the use of a specific compound as a MALDI matrix material, and to the use of a MALDI matrix composition in a gas phase coating method. The matrix material of the invention comprises a 2-mercapto-4,5-dialkylthiazole according to formula (I), wherein X is chosen from S, O or N, and wherein $R^1$ and $R^2$ are independently chosen from hydrogen, methyl, methoxy, ethoxy, and propoxy, or wherein $R^1$ and $R^2$ are taken together to form an optionally substituted aromatic ring structure, optionally comprising one or more heteroatoms, or a tautomeric form thereof. A matrix composition preferably includes the matrix material and an alcohol. The alcohol can be halogenated. The MALDI MS method comprises contacting the analyte with the matrix material or the matrix composition; ionising at least part of the analyte, and separating the ionised components using a mass spectrometer, e.g. TOF-MS. Preferably, bioaerosols are contacted with the matrix material in the gas phase.

(I)

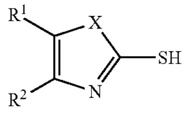

16 Claims, 8 Drawing Sheets

MATRIX FOR REAL-TIME AEROSOL MASS SPECTROMETRY OF ATMOSPHERIC AEROSOLS AND REAL-TIME AEROSOL MALDI MS METHOD

CROSS-REFERENCE TO RELATED APPLICATIONS

This application is the national phase of PCT application PCT/NL2008/050721 having an international filing date of 13 Nov. 2008, which claims benefit of European application No. 07120550.4 filed 13 Nov. 2007. The contents of the above patent applications are incorporated by reference herein in their entirety.

The invention is directed to an aerosol MALDI mass spectrometry method, to the use of a specific compound as an aerosol MALDI matrix material, and to the use of a MALDI matrix composition in a gas phase coating method.

The introduction of matrix-assisted laser desorption/ionisation (MALDI) as a soft ionisation technique in mass spectrometry (MS) has revolutionised the analysis of a wide variety of high mass compounds, including biochemically important polymers. MALDI is a method that allows the production of intact gas-phase ions from large, non-volatile and thermally labile compounds such as proteins, peptides, oligonucleotides, oligosaccharides, and synthetic polymers, typically having a molecular weight of between 400 and 350 000 Da. According to the MALDI MS method, a matrix is used to protect the labile analyte molecule from being directly destroyed by the laser beam.

The soft ionisation technique of MALDI MS typically allows the analysis of biomolecules. MALDI MS is for example used in the analysis and classification of (fractions of) micro-organisms.

A MALDI MS analysis comprises two steps. The first step involves preparing a sample by mixing the analyte with a molar excess of a matrix material. The second step of the MALDI process involves desorption of bulk portions of the solid sample by intense short pulses of laser light. The matrix is believed to serve three purposes: isolation of the analytes from each other, absorption of energy from the laser light to desorb the analytes, and promotion of ionisation. The laser light causes a small fraction of the matrix and analyte sample to be ionised. The molecular masses of the resulting gas-phase ions are usually determined by accelerating the ionised molecules in an electric field and separating the molecules based on their mass in a time-of-flight (TOF) detector. MALDI-TOF is a very sensitive method which allows detection of very small amounts of a component.

The applied matrix material is usually a small organic acid. Commonly used matrix materials include 3,5-dimethoxy-4-hydroxycinnamic acid (sinapinic acid), α-cyano-4-hydroxycinnamic acid (α-cyano or α-matrix) and 2,5-dihydroxybenzoic acid (DHB). Typically, the matrix material is solved in a mixture of highly purified water and another organic compound (normally acetonitrile (ACN)). Normally some acid, such as trifluoroacetic acid (TFA), is also added, because acid can suppress the disturbing influence of salt impurities on the mass spectrum of the analyte. In addition, decreasing the pH of the matrix solution normally results in an increased quality of the sample, such as an increased number and intensity of signals.

Next, the matrix solution is mixed with the analyte to be investigated. The organic compound (e.g. ACN) enables hydrophobic proteins in the sample to dissolve, while the water enables hydrophilic proteins to dissolve. In a conventional MALDI method, this solution is spotted onto a MALDI plate (usually a metal plate designed for this purpose). The solvents vaporise, leaving only the recrystallised matrix, having the analyte proteins spread throughout the matrix crystals. Generally, in aerosol MALDI mass spectrometry the development follows two lines of sample treatment, either with matrix premixing analytes prior to aerosolization or with real-time, in-flight coating of aerosol particles. The in-flight matrix coating enables on-line aerosol MALDI mass spectrometry of atmospheric bioaerosol.

In the case of real-time aerosol single particle MALDI, the aerosols need to be coated with matrix material in the gas phase. Therefore, the matrix material should be sufficiently volatile. Furthermore, a sufficient amount of matrix material should be deposited on the aerosols. Some attempts have been made in the prior art to perform MALDI analysis on aerosols, in particular bioaerosols.

WO-A-02/052246, for instance, describes a MALDI MS method on aerosols, in which the aerosols are provided with a MALDI matrix by evaporation/condensation or sublimation/condensation. According to this document, the dried aerosols coated with MALDI matrix can be ionised with a pulsed laser. Subsequently, the ionised components can be analysed by TOF MS.

In order to analyse micro-organisms that are comprised in bioaerosols, the proteins characteristic for the bacterial species, or even for the bacterial strain, or even for a particular developmental form should be analysed. However, most of these characteristic proteins (such as ribosomal proteins in the molecular mass range of 1-20 kDa) are protected by the cell membrane, and accordingly not readily available for ionisation. Bioaerosols therefore often require an on-line treatment that makes the proteins available for ionisation, for instance by partial degradation of the cell membrane prior to ionisation. Classically, with conventional MALDI, such a treatment comprises the solution of an acid and the MALDI matrix material in water and acetonitrile, followed by addition of the micro-organism analyte and subsequent drying of the mixture. The acid partially degrades the cell membrane, thereby making the characteristic proteins available for ionisation. Important parameters in this method are the ratio of matrix and acid to analyte and the crystal form of the matrix after drying.

It is evident that the above method is hardly suitable for real-time sampling and analysis, since preparation of the analyte takes a lot of steps and time. Further, the inventors recognised, that the use of the acidic conditions combined with high temperatures (>80° C.), necessary for matrix evaporation, has a negative influence on the MS detection response of protein particles in the gas phase. In addition, the matrix material degrades more quickly in the presence of an acid or in aqueous acidic conditions.

A conventional MALDI mass spectrometry setup has a high performance and is therefore suitable for instance for the identification of bacteria on a strain level. However, the performance of on-line aerosol MALDI MS is not yet satisfactory, in particular the performance of on-line bioaerosol MALDI MS of proteins in the molecular mass rang of 1-20 kDa.

Coating of bioaerosols, such as aerosols comprising micro-organisms and/or proteins, with a suitable MALDI matrix material allows an on-line characterisation of the bioaerosols, including the biological material. Aerosols can be coated with a matrix material by condensing the matrix material onto the aerosols from the gas phase such as described in WO-A-02/052246. However, this method is unsuitable for most matrix materials available, as they are not very volatile and/or thermally stable at atmospheric pressure. Furthermore, some known volatile matrix materials, such as 3-nitrobenzyl alcohol and picolinic acid, give unsatisfactory signal quality. There is a strong need for suitable MALDI matrix materials. In addition, there is a strong need for an improved method for providing aerosol with a coating of suitable MALDI matrix material in the gas phase, preferably at atmospheric pressure. Further, it remains a challenge to provide gas phase microorganism containing aerosols with a sufficient amount of matrix material to yield a high response of the characteristic proteins, in particular those in the range of 1-20 kDa.

Object of the invention is to fulfil the need for matrix materials and preparation techniques for real-time/direct i.e. without previous bioaerosol collection, aerosol MALDI mass spectrometry with satisfactory signal quality.

A further object of the invention is overcoming problems encountered in performing MALDI mass spectrometry on aerosols, in particular on bioaerosols.

More particularly, the invention seeks to provide a suitable method for coating a MALDI analyte aerosol surface, with a layer of matrix material.

In a first aspect, the invention is directed to a matrix material for MALDI MS comprising a 2-mercapto-4,5-dialkylheteroarene according to formula (I)

(I)

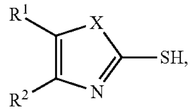

wherein X is chosen from S, O or N, and wherein $R^1$ and $R^2$ are independently chosen from hydrogen, methyl, methoxy, ethoxy, and propoxy, or wherein $R^1$ and $R^2$ are taken together to form an optionally substituted aromatic ring structure, optionally comprising one or more heteroatoms, or a tautomeric form thereof.

The inventors found that the 2-mercapto-4,5-dialkylheteroarene of formula (I) is a very suitable matrix material for aerosol MALDI MS. The 2-mercapto-4,5-dialkylheteroarene matrix material provides excellent signal quality. The required amount of analyte for a MALDI analysis is thereby significantly reduced. In addition, the matrix material of the invention is significantly more volatile than most conventional matrix materials and therefore more suitable for aerosol MALDI MS.

$R^1$ and $R^2$ can be chosen from hydrogen, methyl, methoxy, ethoxy, and propoxy. These small side groups assure the desired volatility of the matrix material. Alkoxy groups are able to enhance to the matrix material volatility. $R^1$ and $R^2$ can also be taken together to form one or more optionally substituted aromatic ring structures (including fused rings), optionally comprising one or more heteroatoms. The one or more aromatic ring structures can for instance comprise a single aromatic 5-, 6-, or 7-membered aromatic ring.

Preferably, $R^1$ and $R^2$ are identical, and more preferably $R^1$ and $R^2$ are both methyl groups. X is preferably S.

Very good results have been achieved with a 2-mercapto-4,5-dialkylthiazole in which both $R^1$ and $R^2$ are methyl groups.

Two different tautomeric forms of the 2-mercapto-4,5-dialkylheteroarene of formula (I) are one in which the proton is bound to the thiol sulphur atom and one in which the proton is bound to the aromatic nitrogen atom. These two tautomeric forms are shown below.

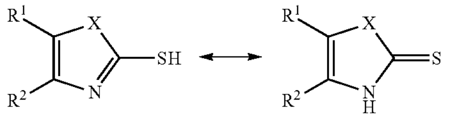

For real-time aerosol MALDI MS, the matrix material should be brought into the gas phase in order to deposit the matrix material onto aerosols. Preferably, the matrix material is deposited onto the analyte at atmospheric pressure. Although the 2-mercapto-4,5-dialkylheteroarene of formula (I) can be brought into the gas phase, the inventors realised that the amount of matrix material that can be evaporated is limited due to degradation of the material by the applied evaporation heat. Typically, the matrix material starts to degrade at temperatures of about 90° C. or more.

Analysis of the degraded material showed that the decomposition products of the 2-mercapto-4,5-dialkylheteroarene of formula (I) comprise conjugates of the original 2-mercapto-4,5-dialkylheteroarene, in which two molecules are bound via the thiol group. Some of the conjugates are linked through a —C—S—C— linkage, while others are linked through a —C—S—S—C— linkage.

Without wishing to be bound by theory, the inventors believe that the conjugate with the —C—S—C— linkage is formed by intermolecular reaction of the thiol groups of two different 2-mercapto-4,5-dialkylheteroarene molecules under release of $H_2S$. Furthermore, the inventors believe that the conjugate with the —C—S—S—C— linkage is formed by an oxidation reaction of the thiol groups of two different 2-mercapto-4,5-dialkylheteroarene molecules under release of two protons and two electrons.

The inventors found that it is possible to at least partly protect the thiol groups of the 2-mercapto-4,5-dialkylheteroarene molecules by adding an alcohol to the matrix solution. The alcohol is able to form a hydrogen bond with the free electron pair of the thiol sulphur atom of the tautomeric form in which the proton is bound to the aromatic nitrogen as shown below.

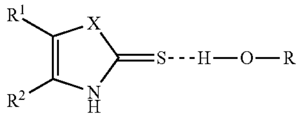

As a result, the tautomeric form in which the proton is bound to the aromatic nitrogen atom is favoured and the 2-mercapto-4,5-dialkylheteroarene will be mainly present in this tautomeric form. In addition, the formation of hydrogen bonds between the 2-mercapto-4,5-dialkylheteroarene molecules and the alcohol molecules is capable of increasing the volatility of the matrix material.

Accordingly, in a further aspect the invention is directed to a matrix composition for real-time aerosol MALDI MS comprising a 2-mercapto-4,5-dialkylheteroarene according to formula (I) or a tautomeric form thereof, and an alcohol. This matrix composition is particularly advantageous for aerosol MALDI MS, because it can be readily brought into the gas phase in order to deposit the matrix material onto the aerosols.

Preferably, the molecular weight of the alcohol is relatively low. Suitable alcohols are for instance methanol, ethanol, propanol, isopropanol, n-butanol, sec-butanol, isobutanol, and tert-butanol. Also alcohols with more than one hydroxy group can be applied, such as glycol, propane-1,2-diol, propane-1,3-diol, glycerol, butane-1,2-diol, butane-1,3-diol, butane-2,3-diol, butane-1,2,3-triol and butane-1,2,4-triol.

Although in general polyhydric alcohols, such as diols and triols, are less volatile than monohydric alcohols, they have the advantage in that they have extra hydroxyl groups available for the formation of hydrogen bridges.

Furthermore, the alcohol (in particular ethanol) is capable of degrading the cell membrane to an extent sufficient for the proteins of interest to become available for ionisation. Thus, the presence of the alcohol at the same time acts as release agent for releasing the characterising proteins from the micro-organisms.

An important advantage of the presence of an alcohol is that the 2-mercapto-4,5-dialkylheteroarene matrix material is not, or at least less quickly, degraded by the applied evaporation/sublimation heat. It was found that, in combination with an alcohol, the matrix material of the invention maintains its activity for a significantly increased period of time, such as for at least 10 months, preferably at least 12 months in comparison to a few minutes or hours in low to zero concentrations of an alcohol, even at a heating temperature of for instance 150° C.

The use of high temperatures, such as temperatures of more than 100° C., preferably more than 120° C., more preferably more than 150° C. also contributes to releasing the characterising proteins from the micro-organisms, see e.g. Horneffer et al. *J. Am. Soc. Mass Spectrom.* 2004, 15(10), 1444-1454.

The inventors further found that it is advantageous to apply halogenated alcohols. A preferred halogen is chlorine, even more preferred is fluorine. In principle a single halogen substitution in the alcohol already gives an advantageous effect.

In a preferred embodiment, at least the β carbon atom is substituted with one or more halogen atoms. Suitable examples of such halogenated alcohols are trifluoroethanol, pentafluoropropanol, and hexafluoroisopropanol. Even more preferred is an embodiment in which the alcohol is fully halogenated, i.e., all carbon bound hydrogen atoms are substituted with a halogen atom. Examples of fully halogenated alcohols are trichloromethanol, trifluoromethanol, perchloroethanol, perfluoroethanol, perchloropropanol, perfluoropropanol, perchlorobutanol, and perfluorobutanol.

The high electron-withdrawing ability of the halogen substitutes increases the electronegativity of the hydroxyl group of the alcohol molecule. This leads to a stronger hydrogen bond between the alcohol and the 2-mercapto-4,5-dialkylthiazole molecules of the invention. Hence, the advantageous tautomeric form of the matrix material of the invention in which the proton is bound to the aromatic nitrogen atom is favoured even more. As a result, the performance of the real-time aerosol MALDI MS analysis is further improved.

The alcohol is preferably applied at a concentration such that a saturated vapour pressure is realised in the temperature range of 15-100° C., depending on the type of alcohol. However, also partially saturated alcohol vapours may be used.

Accordingly, the invention is directed to a real-time aerosol MALDI MS method for analysing an analyte, comprising contacting the aerosol analyte with a matrix material as described above;

ionising at least part of said analyte; and separating the ionised components using a MS detector, e.g. a time-of-flight detector.

During contacting of the analyte with the matrix material, the matrix material can deposit on the aerosol and form a matrix coating.

It is preferred that the analyte is contacted with the matrix material in the gas phase. Because the amount of matrix material of the invention that can be sublimated increases in the presence of an alcohol and because an alcohol is capable of increasing the volatility of the matrix material, it is preferred to use the matrix compound of Formula I in a composition with an alcohol.

The inventors found that in accordance with this method the aerosol analyte is provided with a uniform, homogeneous layer of matrix material. This is advantageous, because inhomogeneities in the surface of the analyte can negatively influence the MALDI analysis. Hence, this method significantly improves the signal quality of the MALDI spectrometry on aerosols. This improvement is particularly useful for bioaerosols, because of the delicate analysis of characteristic proteins. The at least partially saturated atmosphere can advantageously be at least partially saturated with one or more alcohols as described herein. Preferably a matrix containing ethanol solution is introduced as small droplets into the heated zone of the apparatus. The advantage of this is that there is a single liquid stream in the mass spectrometer and that the concentration of the matrix can be controlled more precisely.

During the on-line aerosol sampling the vapour pressure should preferably be kept high, which can be achieved by additional evaporation of liquid such as alcohol or water.

In some cases it is preferred to add an volatile acid to the coated aerosol stream. Preferably volatile organic acids (that are volatile at a temperature ranging from room temperature to 100° C.) are used, and most preferably trifluoroacetic acid (TFA).

The analyte, and preferably at least one particle in the analyte, can comprise micro-organisms (including bacteria, fungi, algae, protozoa and viruses) and/or proteins (including toxins) or any other biological material e.g. lymphocytes or cell tissue.

Preferably the at least one aerosol has an average particle size as measured by transmission electron microscopy of at least 0.1 μm. It is preferred that the average particle size as determined by transmission electron microscopy is at most 20 μm. Accordingly, the at least one aerosol particle can have an average particle size in the range of 0.3-20 μm, preferably in the range of 0.5-15 μm.

In a preferred embodiment, the analyte has been subjected to a selection prior to the method of the invention. A suitable selection method is for instance described in WO-A-2002/052246, which is hereby incorporated by reference. According to this method bioaerosol particles are selected based on the property that the presence of specific substances, such as amino acids, induces a characteristic fluorescence when irradiated with a suitable wavelength. In general, inorganic and most of the organic substances do not show this characteristic. Thus, bioaerosol particles can be selected by means of an excitation laser which effects fluorescence of specific substances in bioaerosol particles, after which a detector selects the fluorescent bioaerosol particles and a second laser is triggered to ionise the selected bioaerosol particles.

Preferably, the selection comprises a size selection. The size of aerosol particles comprising bacteria and viruses is typically below 20 μm. Because the aerosol particles enter the central space of the mass spectrometer at a given speed, the size of the successive aerosol particles can be determined from the duration of a known distance traversed by an aerosol particle. By directing the excitation laser beam to two successive spots with a known mutual distance, the above duration and hence the size of the aerosol particle can be determined from the light scattered and detected by an aerosol particle. This allows selective ionisation of biomaterial in a specific size window. Hence, it is possible to identify a biomaterial of specific size (such as bacteria) from a mixture of different materials.

The invention allows the classification of micro-organisms (including bacteria, fungi, algae, protozoa and viruses) and/or proteins (including toxins) or any other biological material e.g. lymphocytes or cell tissue. The different species can be classified according to their spectral characteristics. Such classification can be very specific and it is even possible to differentiate between micro-organisms in different developmental stadia. A method for the classification of biomaterials comprises obtaining a MALDI MS spectrum of different biomaterials (such as different bacteria, different cells, different viruses etc.), comparing the obtained MALDI MS spectrum with a library of MALDI MS spectra; and on the basis of said comparison classifying said biomaterial. It has been shown possible to perform a reliable classification on basis of only one measurement on a single particle. This is particularly useful when the method as described above is used for analysis of samples of air with low concentrations of bioparticles.

Furthermore the invention allows monitoring the quality of air or liquid, e.g. water, in particular in respect of particulate matter and micro-organisms.

In a further aspect the invention is directed to the use of 2-mercapto-4,5-dialkylheteroarene according to formula (I) as a matrix material for aerosol MALDI MS.

In yet a further aspect the invention is directed to the use of a matrix composition as defined herein in a gas phase matrix coating method for MALDI MS.

In another aspect, the invention is directed to a MALDI MS method for analysing an analyte, comprising contacting the analyte with a 2-mercapto-4,5-dimethylthiazole matrix material;

ionising at least part of said analyte; and separating the ionised components using an MS detector.

Although 2-mercapto-4,5-dialkylheteroarene and similar compounds in general have been known as matrix material for MALDI MS (e.g. 2-mercaptobenzothiazole and its analogues as described in Naxing, X. et al., 1997, J. Am. Soc. Mass Spectrom. 8:116-124 and Domin, M. A. et al., 1999, Rapid Comm. Mass Spectrom. 13:222-226; and 5-ethyl-2-mercaptothiazole as described in Raju, N. P. et al., 2001, Rapid Comm. Mass Spectrom. 15:1879-1884), the specific compound 2-mercapto-4,5-dimethylthiazole has not been disclosed as such. Further, it has been known in the filed that small changes in the matrix molecule can lead to large effects on the applicability of a compound as matrix in MALDI MS. It basically has appeared unpredictable whether a certain compound can be used as a matrix molecule and for which specific applications. It has now been found, as shown in the examples, that 2-mercapto-4,5-dimethylthiazole is a matrix molecule that is very suitable for detection of biological macromolecules such as proteins and carbohydrates comprised on micro-organisms. This usefulness of this specific matrix compound even enables classification of micro-organisms on basis of their spectral parameters.

The invention will now be further illustrated by means of the following non-limitative examples.

EXAMPLE 1

Reproducibility

Figure 1:
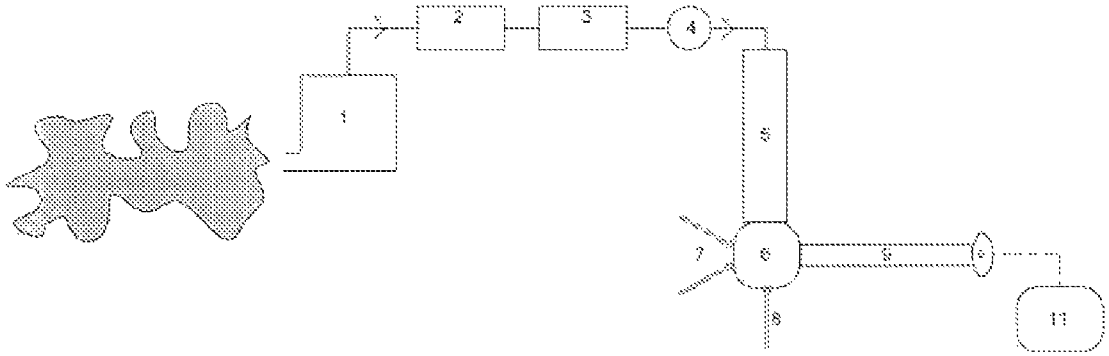
FIG. 1: Experimental setup. See Example 1 for legends.

The experimental setup used for analysing aerosols containing *Bacillus thuringiensis* is shown in FIG. 1. Aerosol particles in the gas phase enter the MALDI setup in entrance room (1) and are led to an optionally heated tube (2) comprising a liquid (such as an alcohol) and subsequently through a tube (3) comprising the matrix material. The first part of this tube is heated, while the second part is not, so that the matrix material deposits in the second part and a coating is formed on the aerosols. The coated aerosols pass a dryer (4) and an aerosol beam generator (5) after which the coated aerosols enter a source room (6) where they are detected by scattering and UV light (7). The proteins of interest in the aerosols are then ionised by ionisation-laser (8). The obtained ions are separated based on their mass in the TOF tube (9) and then detected on detector (10). Acquisition and processing of the data is performed with personal computer (11).

The pressure in the system decreases by means of a series of pumps of about 100 kPa (atmospheric) in entrance room (1), tube (2) and tube (3) to $10^{-5}$ kPa in source room (6) and TOF tube (9). The flow through the system is in the range of 600-1 000 ml/min.

Real-time MALDI aerosol TOF spectra of aerosols containing *Bacillus thuringiensis* using 2-mercapto-4,5-dimethylthiazole as matrix material were recorded.

Figure 2:
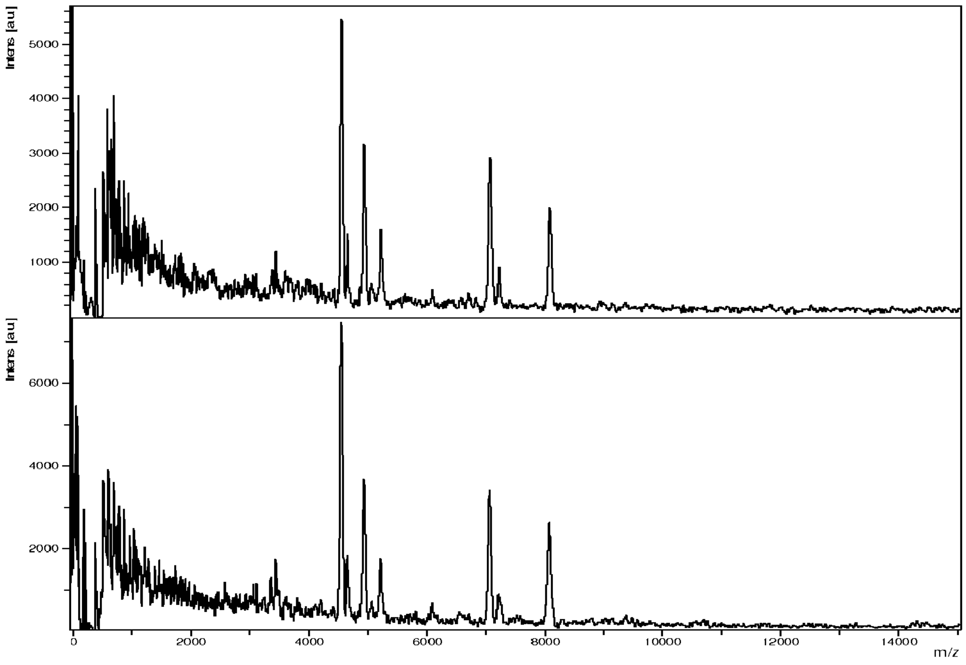
FIG. 2: Day-to-day reproducibility of real-time aerosol MALDI TOF MS spectra of *B. thuringiensis* cells kept overnight in physiological salt solution.

The on-line aerosol MALDI TOF MS instrument reproducibility including real-time sample preparation is demonstrated in FIG. 2. The comparable characteristic peak patterns (i.e. MALDI fingerprints) in FIG. 2 show a consistent day-to-day reproducibility. The results illustrated by FIG. 2 were reproduced by several identical experiments with *B. thuringiensis* and *B. cereus* vegetative cells and spores (data not shown) indicating that the system's reproducibility and stability is satisfactory.

EXAMPLE 2

Distinguishing Potential

The distinguishing potential of the invention was demonstrated by results obtained in a similar way as described under Example 1, but with several *Bacillus* species, such as *B. cereus* (two strains), *B. thuringiensis*, and *B. globigii*. According to their 16SrRNA sequences it is suggested to consider *B. cereus* and *B. thuringiensis* as closely related species. One of the tested bacterium strains *B. cereus* ATCC 14579 has a similarity in *B. thuringiensis* of 99.6% based on base-pair substitutions and similarities in 16S rDNA nucleotide sequences. Aerosols of vegetative cells and spores from the above *Bacillus* species were coated real-time with matrix material as described in Example 1, and real-time analysed by aerosol MALDI TOF MS.

Vegetative Cells Vs. Spores

Figure 3:
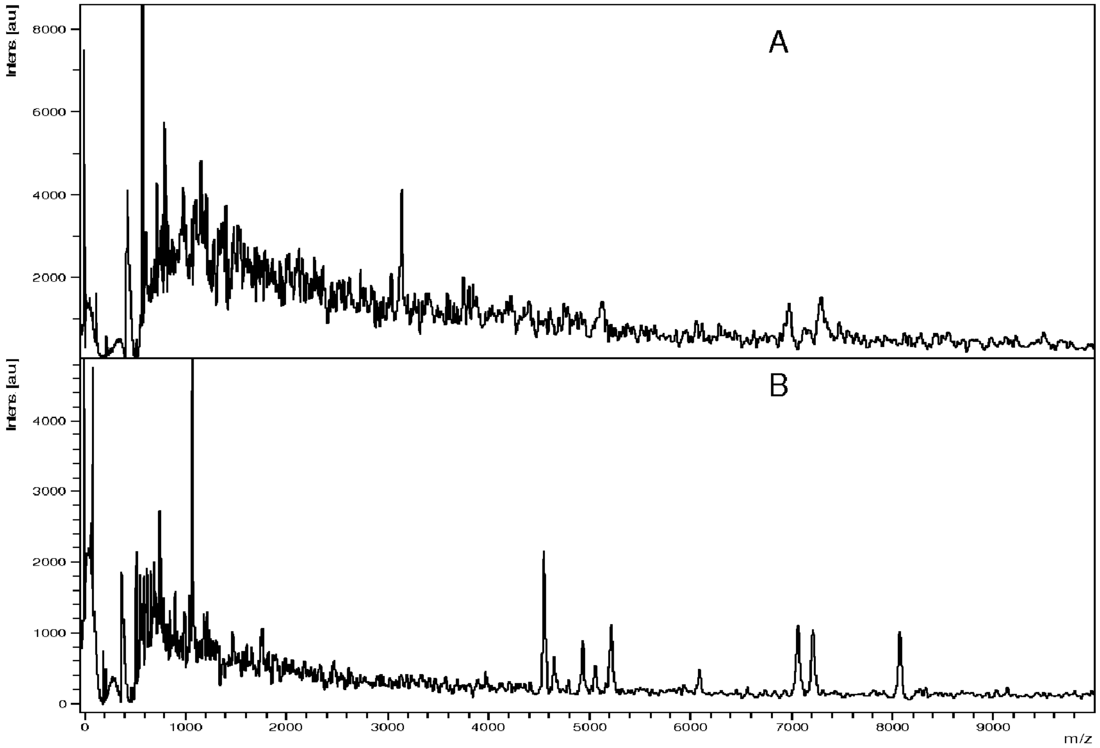
FIG. 3: In-flight aerosol MALDI TOF MS spectra of *B. thuringiensis* spores (A) and cells (B).

First sporal and vegetative cells of the same species of *B. thuringiensis* were measured. The obtained different MALDI fingerprints as depicted in FIG. 3, between the sporal (A) and vegetative cells (B) of *B. thuringiensis* show a clear discrimination between both.

Closely Related Species

Figure 4:
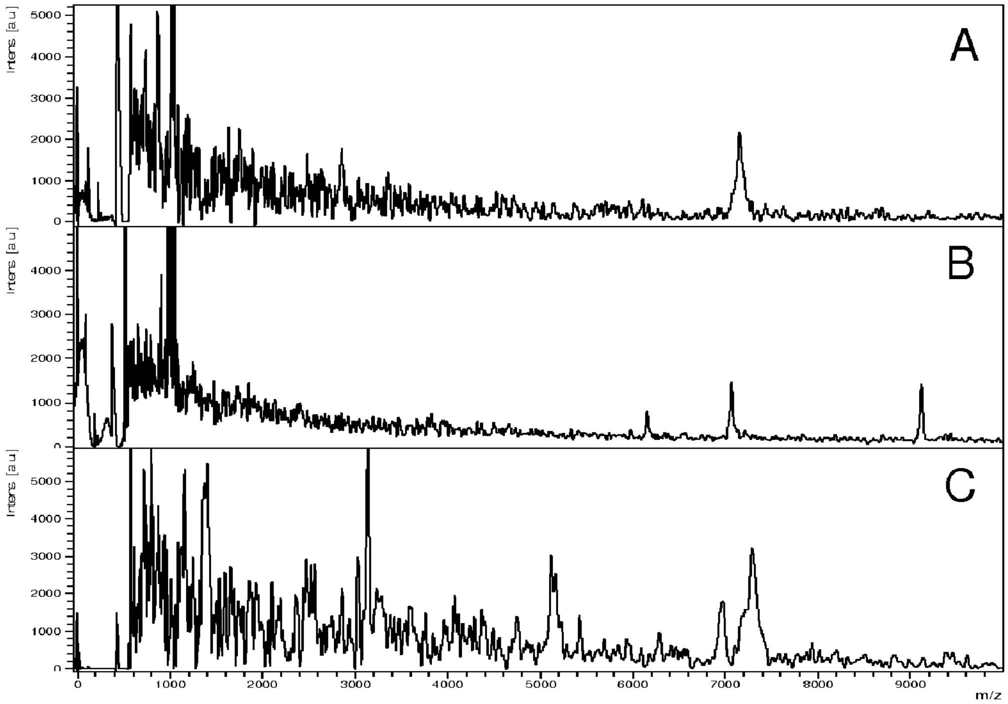
FIG. 4: Real-time aerosol MALDI TOF MS spectra of (A): *B. globigii*, (B): *B. cereus*, and (C): *B. thuringiensis* spores.

Next, the aerosol MALDI TOF MS distinguishing potential was illustrated by results of closely related species, obtained from spores of *B. thuringiensis, B. cereus* and *B. globigii* cultured under the same growth conditions to prevent growth depending differences. As can be seen in FIG. 4, *B. globigii* (A), *B. cereus* (B), and *B. thuringiensis* (C) species show very characteristic spectra, which can be used to distinguish them readily.

Figure 5:
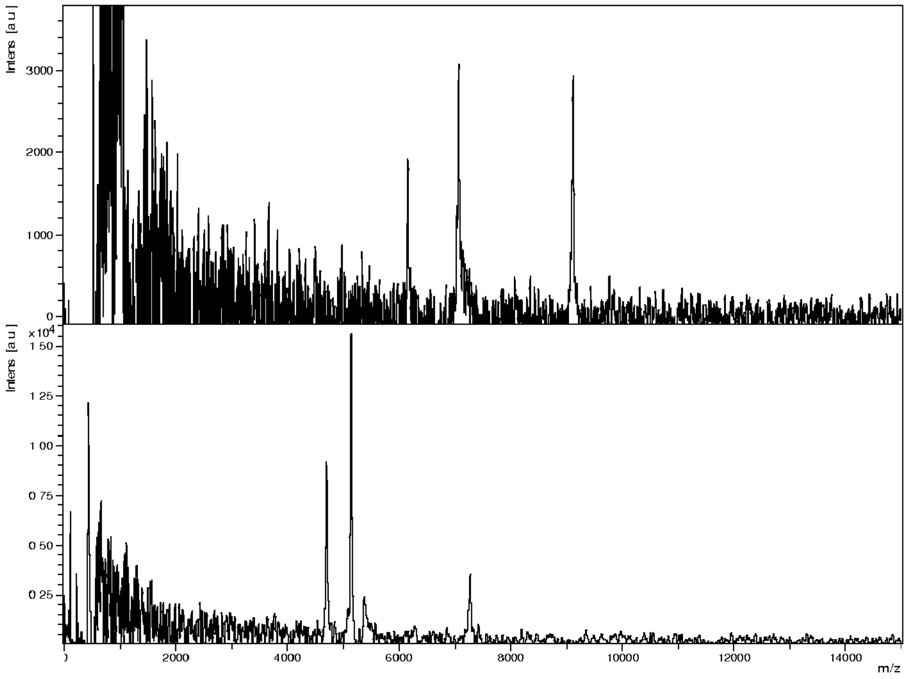
FIG. 5: In-flight aerosol MALDI TOF MS spectra of two *B. cereus* strains.

In FIG. 5 the distinguishing potential is demonstrated by results of two *B. cereus* strains cultured under the same growth conditions to prevent growth depending differences. Also the spores of two *B. cereus* strains can be distinguished from each other as demonstrated by the different MALDI profiles in both spectra. The results indicate that closely related micro-organisms such as *B. thuringiensis, B. globigii, B. cereus* (including two strains) can be distinguished from each other even on strain level by the use of the invention combined with aerosol MALDI MS.

Separation on Single Particle Level within One Bacterial Culture

Separation at single cell or particle level is possible by clustering cells or particles based on the aerodynamic diameter, fluorescence or mass spectral fingerprint.

With the use of the invention sufficient mass spectral information is available in single shots to apply fingerprint clustering. Single shots may be individual cells, spores, clustered cells, spores, proteins, peptides, growth media or other background particles.

Figure 6:
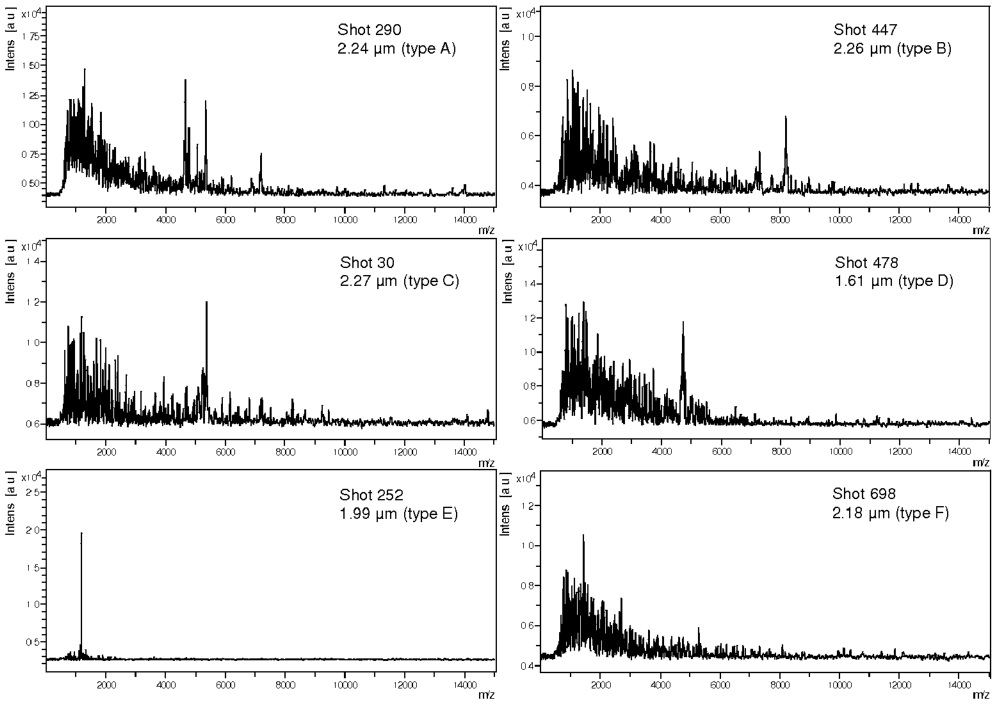
FIG. 6: Example of different fingerprints of individual *B. thuringiensis* vegetative cells/clustered particles within one culture.

FIG. 6 shows data of 6 shots/particles clustered on mass spectral fingerprints of *Bacillus thuringiensis.*

EXAMPLE 3

Aerosol MALDI TOF MS vs. Common MALDI TOF MS

Figure 7:
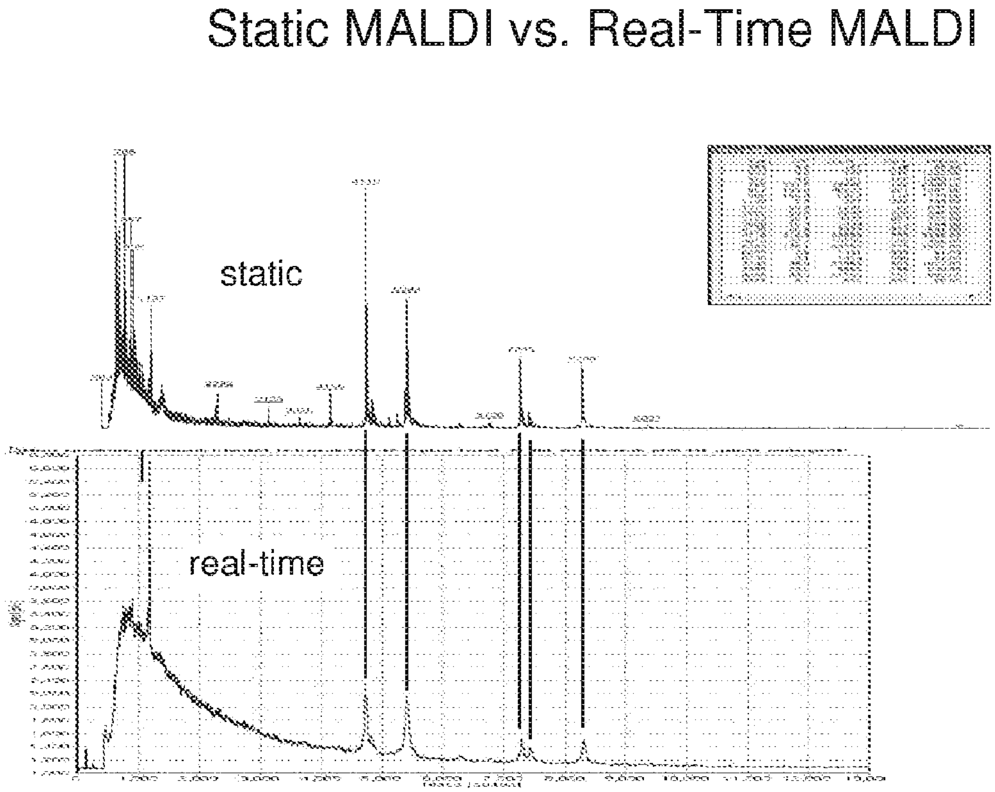
FIG. 7: Example of real-time (real-time) aerosol MALDI versus common (static) MALDI of *B. thuringiensis* vegetative cells cultured on agar plate using standardised matrix conditions.

For aerosol MALDI TOF MS the support of common MALDI TOF MS is fundamental to create a microbial database. In spite of distinct differences between both techniques—i.e. unknown matrix morphology and ionization in the flight—comparable spectra were obtained if the inventions matrix recipe is used both with common MALDI TOF MS and aerosol MALDI TOF MS. FIG. 7 shows an example of spectra obtained from vegetative cells of *B. thuringiensis* cultured on an agar plate for one week and recorded with both techniques.

The same peak clusters were found at: 4 710, 4 816, 7 242, 7 385 and 8 259 Da in both spectra. The good resemblance between the common MALDI and aerosol MALDI TOF MS results was also confirmed with gram negative micro-organism such as *Pseudomonas stutzeri* genomovars, *Escherichia coli, Vibrio cholerae* and *Erwinia herbicola* and viruses *Autographa californica* nuclear polyhedrosis virus (AcNPV) and *Cydia pomonella* granulosis virus and MS2 bacteriophage (data not shown).

EXAMPLE 4

Other Microbial Species

Gram Negative Micro-Organisms

Figure 8:
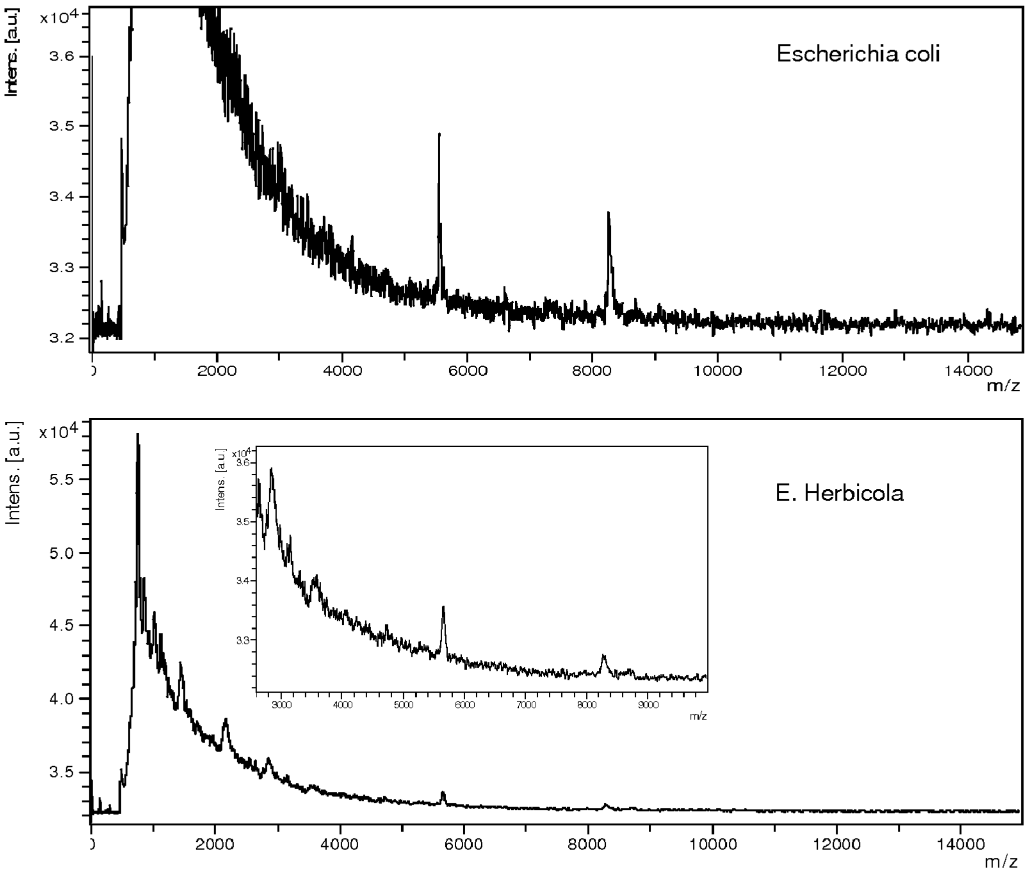
FIG. 8: Real-time aerosol MALDI TOF MS spectra of *E. herbicola* and *E. coli* cultured on agar plate using standardised matrix conditions.

Next to the presented gram positive *bacillus* species also gram negative micro-organism such as *Pseudomonas stutzeri* genomovars (11 species), *Escherichia coli, Vibrio cholerae* and *Erwinia herbicola* give distinguishable spectra in FIG. 8 shows an example of *E. coli* compared to *E. herbicola.*

Viruses

The following viruses were tested: the bacteriophage MS2 and the Baculo viruses *Autographa californica* nuclear polyhedrosis virus (AcNPV) and *Cydia pomonella* granulosis virus. The bacteriophage MS2 represents a RNA type virus. The Baculo viruses are double-stranded DNA (dsDNA) viruses. Identical spectra were obtained with aerosol MALDI TOF MS and common MALDI TOF MS. In case of MS2, the $[M+H]^+$ (m/z 13 726) and $[M+2H]^{+2}$ (m/z 6 865) ion signals of the 13 kDa capsid protein were detected (data not shown). Bacteriophages specific for other bacterial species typically have capsid proteins of different molecular weight and therefore give a different MALDI signal.

Figure 9:
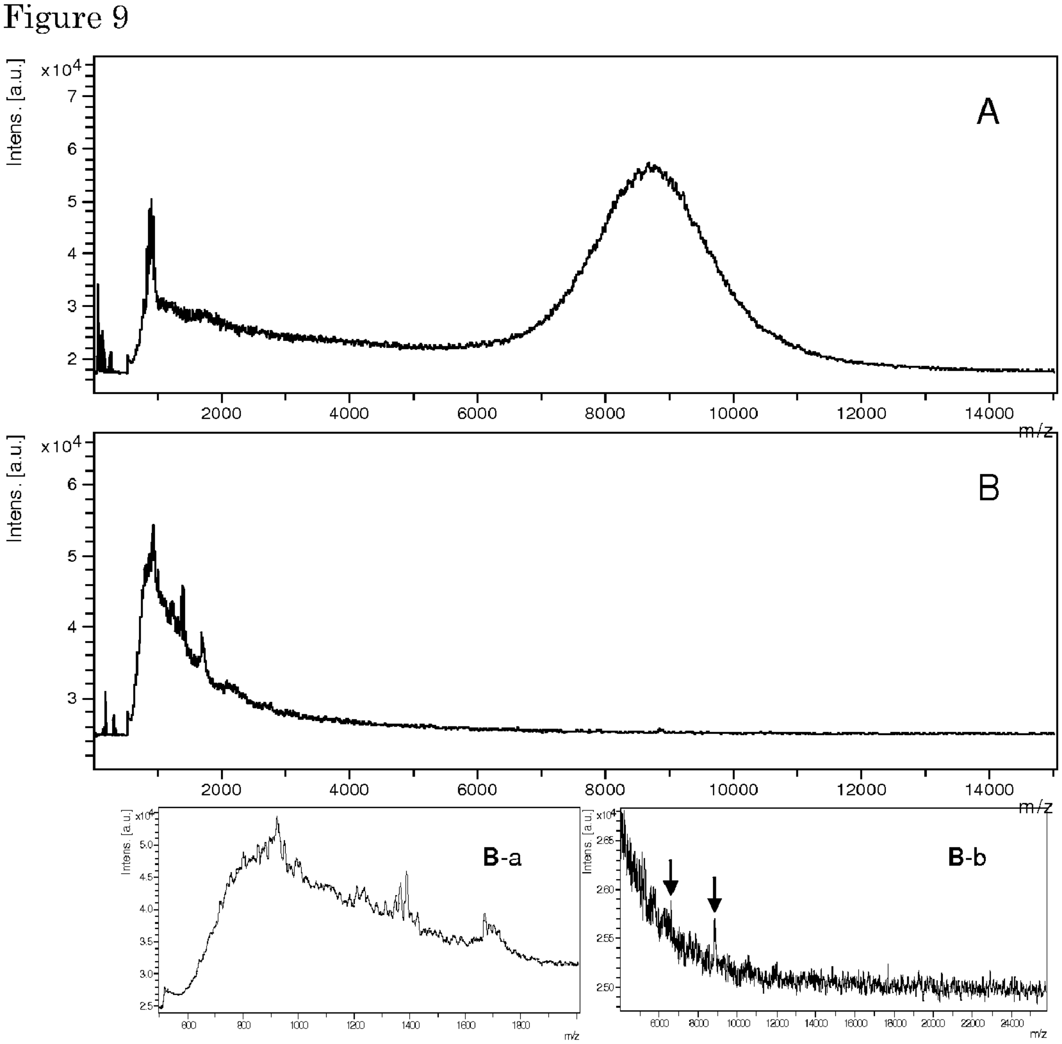
FIG. 9: Real-time aerosol MALDI TOF MS spectra of (A) AcNPV virus with characteristic broad band of 6 000-12 000 Da, and (B) CpGV virus with characteristic signal clusters at 1 242-1 257-1 279 Da and 6 460 and 8 675 Da; (B-a) and (B-b): enlargements.

The difference between the spectra of the Baculo viruses is evident (see FIG. 9). The aerosol MALDI TOF MS spectra of AcNPV virus (A) contains a characteristic broad band of 6 000-12 000 Da probably part of the major glycoprotein envelope. The CpGV virus (B) shows characteristic signal clusters at 1 242-1 257-1 279 Da and 6 460 and 8 675 Da.

EXAMPLE 5

Liquid Sample Analysis

Next to the direct applicability of the invention to aerosol samples also liquid samples, such as water, bodily fluids and blood, can be handled in low volumes of 50-200 μl. The fluids are aerosolised using a Meinhard nebulizer providing an aerosol with a carrier gas of filtered air. The generated aerosol is real-time coated by use of the invention and the individual particles can be analysed by selection of aerodynamic diameter and/or fluorescence and/or MALDI TOF MS fingerprint.

Toxin in Canal Water

Figure 10:
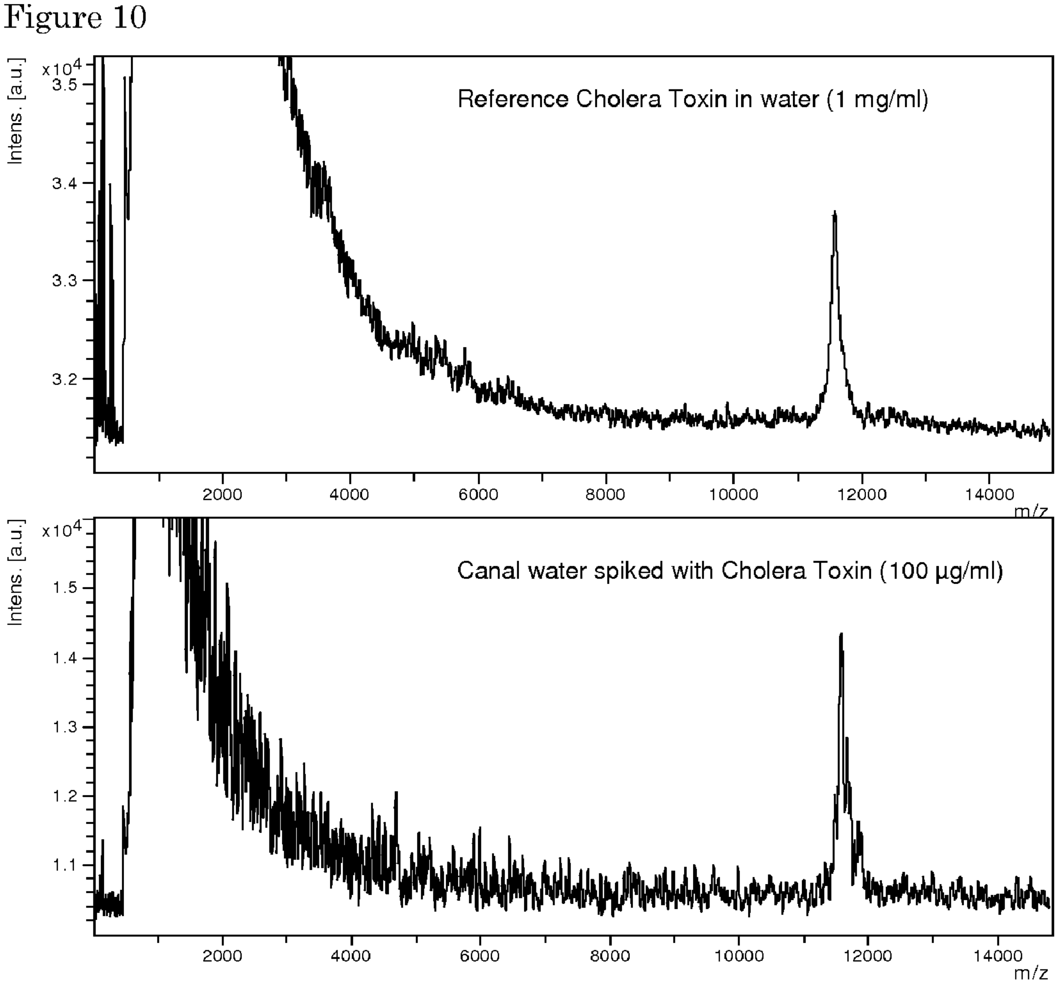
FIG. 10: Real-time aerosol MALDI TOF MS spectra of cholera toxin reference in water (600 shots/particles summed) and 12 summed cholera toxin containing shots selected from 600 shots/particles of canal water.

FIG. 10 shows the result of cholera toxin spiked (100 μg/ml) to canal water. The canal water was filtered over a 0.2 μm filter to remove microbial particles and 60 ml was aerosolised and on-line analyzed.

Cholera toxin consists of an A subunit with a molecular mass of 24 kDa and 5 B subunits of 12 kDa. The mass spectra of the reference in water and spiked canal water show the characteristic mass of the B-subunit of Cholera toxin. In case of the canal water 12 summed single shot spectra containing the characteristic cholera toxin mass spectrum are sufficient to indicate the presence of cholera toxin when selected from a background of 600 shots/particles of canal water.

T and B Lymphocytes

Figure 11:
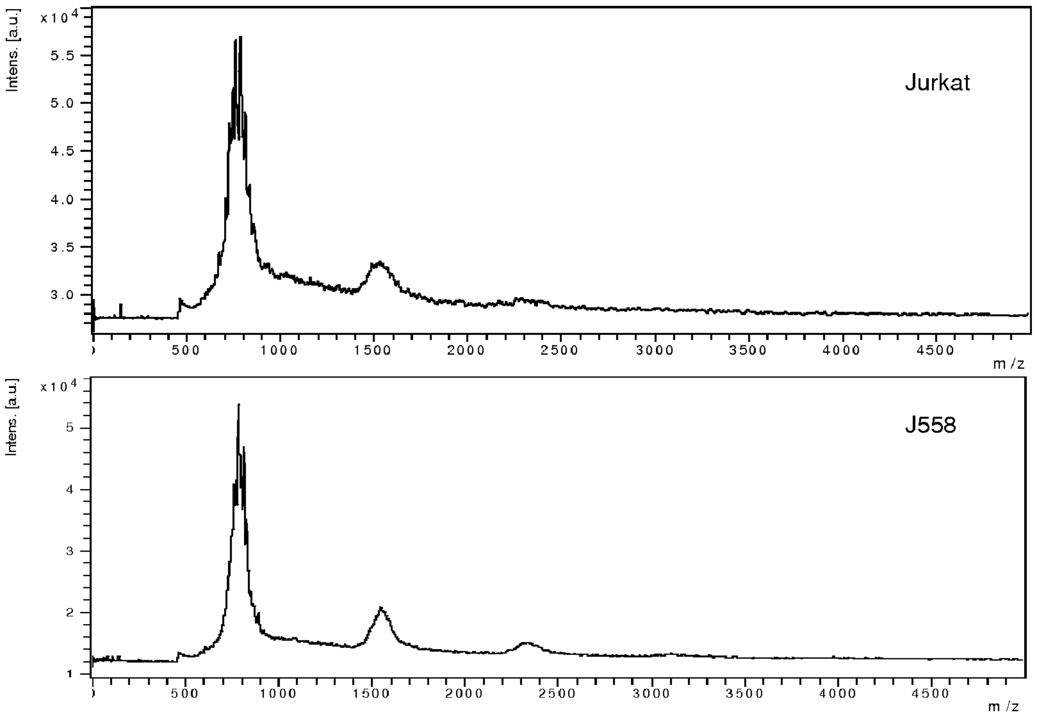
FIG. 11: Real-time aerosol MALDI TOF MS spectra of J558 B lymphocytes and Jurkat T lymphocytes cell lines.

T and B lymphocytes are the major cellular components of the adaptive immune response. T cells are involved in cell-mediated immunity whereas B cells are primarily responsible for humoral immunity (relating to antibodies). They form memory cells that remember the pathogen to enable faster antibody production in case of future infections. The potential to analyse intact B and T lymphocytes was studied on Jurkat T lymphocytes and J558 B lymphocytes cells. Small amounts of about 50 μl were introduced with a Meinhard nebuliser. FIG. 11 shows the aerosol MALDI TOF MS average summed mass spectra of Jurkat T lymphocytes and J558 B lymphocytes.

CONCLUSION

The above examples demonstrate the generic capability to generate discriminative MS fingerprints from materials of biological origin. The invention combined with an aerosol MALDI TOF MS has proved to be a rapid and fast tool for easy discrimination of species up to strain level. When using the invention sample matrix conditions the MALDI results will be near identical to common MALDI, which indicates the availability of the necessary support of common MALDI to create databases and the use of these databases for interpretation. The invention combined with aerosol MALDI TOF MS as compared to common MALDI has a great advantage being not or less influenced by the presence of natural inorganic or biological backgrounds due to the analysis on single particle level instead of bulk material.

The invention claimed is:

1. MALDI mass spectrometry method for analysing an aerosol analyte, comprising providing an at least partially saturated vapor of an alcohol at a temperature of 15-100° C. to contact a matrix material for MALDI mass spectrometry;

sublimating said matrix material in the presence of the alcohol vapor wherein the matrix material comprises a 2-mercapto-4,5-dialkylheteroarene according to formula (I)

(I)

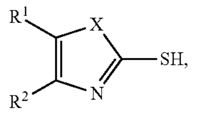

or a tautomeric form thereof wherein X is N, S or O, and wherein each $R^1$ and $R^2$ is independently hydrogen, methyl, methoxy, ethoxy, or propoxy, or wherein $R^1$ and $R^2$ are taken together to form an optionally substituted aromatic ring structure, optionally comprising one or more heteroatoms, contacting the aerosol analyte in the gas phase with the sublimated matrix material;

ionising at least part of said analyte; and separating the ionised components using a mass spectrometer.

2. Method according to claim 1, wherein $R^1$ and $R^2$ are identical.

3. Method according to claim 1, wherein $R^1$ and $R^2$ are methyl groups.

4. Method according to claim 1, wherein X is S.

5. Method according to claim 1, wherein the alcohol is methanol, ethanol, propanol, isopropanol, n-butanol, sec-butanol, isobutanol, or tert-butanol.

6. Method according to claim 1, wherein the alcohol is a polyhydric alcohol.

7. Method according to claim 1, wherein said alcohol is halogenated.

8. Method according to claim 7, wherein the β-carbon of the alcohol is substituted with at least one halogen atom.

9. Method according to claim 7, wherein said alcohol is fully halogenated.

10. Method according to claim 1, wherein said aerosol has an average particle size as measured by transmission electron microscopy of at least 0.1 μm.

11. The method of claim 10 wherein said at least one aerosol analyte has an average particle size of 0.3-20 μm.

12. The method of claim 10 wherein said at least one aerosol analyte has an average particle size of 0.5-15 μm.

13. Method according to claim 1, wherein said aerosol analyte comprises biological material.

14. Method according to claim 1, wherein said aerosol analyte has been subjected to particle size selection prior to said contacting with said matrix material.

15. Method for classifying biomaterials comprising obtaining a MALDI mass spectrum of different biomaterials using a method according to claim 1;

comparing the obtained MALDI MS spectrum with a library of MALDI MS spectra; and on basis of said comparison classifying said biomaterial.

16. MALDI mass spectrometry method for analysing an aerosol analyte, comprising providing an at least partially saturated vapor of an alcohol at a temperature of 15-100° C. to a matrix material;

sublimating said matrix material which comprises 2-mercapto-4,5-dimethylthiazole in the presence of the alcohol vapor;

contacting the aerosol analyte in the gas phase with the sublimated matrix material ionising at least part of said analyte; and separating the ionised components using a time-of-flight detector.

* * * * *